United States Patent

[11] 3,624,088

| [72] | Inventors | Pal Benko;<br>Zoltan Budai; Laszlo Pallos;<br>Edit Berenyi, nee Poldermann, all of<br>Budapest, Hungary |
|---|---|---|
| [21] | Appl. No. | 815,238 |
| [22] | Filed | Apr. 10, 1969 |
| [45] | Patented | Nov. 30, 1971 |
| [73] | Assignee | Egyesult Gyogyszer-es Tapszergyar |
| [32] | Priority | Apr. 12, 1968 |
| [33] | | Hungary |
| [31] | | EE 1505 |

[54] TRICHLORO-ETHYLIDINE AMINO QUINOLINES
3 Claims, No Drawings

[52] U.S. Cl. ............................................. 260/288,
71/90, 71/94, 71/121, 424/258, 424/270, 424/330,
260/286, 260/297R, 260/306.8, 260/328,
260/564R, 260/568

[51] Int. Cl. ......................................................... C07d 33/52
[50] Field of Search ........................................... 260/288,
288 R

[56] References Cited
UNITED STATES PATENTS

| 2,653,940 | 9/1953 | Johnson | 260/288 |
| 3,000,894 | 9/1961 | Bimber | 260/289 |
| 3,002,001 | 9/1961 | Surrey | 260/288 |
| 3,374,233 | 3/1968 | Hamilton | 260/240 |
| 3,501,487 | 3/1970 | Poos | 260/288 |

*Primary Examiner*—Donald G. Daus
*Attorney*—McGlew and Toren

ABSTRACT: Trichloro ethylidine amine derivatives of quinolines, thiazoles and tetrahydronaphthalenes having anthelmonthic and fungicidal activity are disclosed.

TRICHLORO-ETHYLIDENE AMINO QUINOLINES

The invention relates to the preparation of new β,β,β-trichloroethylidene amine derivatives having anthelmintic and fungicide activity.

It has been found that the new β,β,β-trichloroethylidene amine derivatives of the general formula I $$A-N=CH-CCl_3 \quad (I)$$

wherein A represents a quinolyl group unsubstituted or substituted by halogen, lower alkyl or nitro groups, a 2-thiazolyl group unsubstituted or substituted by one or two methyl groups or a tetrahydronaphthyl group, have valuable anthelmintic and fungicide properties and can be used also as intermediate products for the preparation of further valuable compounds, e.g. of formamidine derivatives having anthelmintic and herbicide activity.

These new β,β,β-trichloroethylidene derivatives can be prepared by a method known per se but used hitherto only for the preparation of analogous compounds containing alkyl or phenyl groups attached to the nitrogen atom (cf. Chem. Ber. 100, 1814/1967/); this method comprises reacting trichloroacetaldehyde with a quinolyl, 2-thiazolyl or tetrahydronaphthyl amine of the general formula II $$A-NH_2 \quad (II)$$

wherein A has the same meaning as above.

This reaction may be carried out in the presence or absence of a solvent, e.g. of benzene, toluene or xylene it is in some cases preferable to distill off the water formed during the reaction.

The new compounds of the formula I are solid crystalline products decomposing easily under the influence of heat; some of them have low melting points or are even liquid at room temperature. Because of their heat sensitivity they can be purified only by recrystallization. In order to avoid the contamination of the product by unreacted trichloroacetaldehyde, it is preferable carry out the above reaction with a slight excess of the amine of the formula II.

The compounds of the formula I obtained as described above may be converted into acid addition salts by the usual methods.

The anthelmintic acting of the new compounds of the general formula I has been tested against the parasites *Enchytraeus albidus* (E), *Tubifex rivulorum* (T) and *Schistosma mansoni cercaria* (S); the inhibiting concentrations are given in the following table; the corresponding values obtained with the following known anthelmintic agents are shown for comparison:

YOMESAN, i.e. N-(2'-chloro-4'-nitrophenyl)-5-chloro-salicylic amide (A),
METHYRIDIN, i.e. 2-(β-methoxyethyl)-pyridine (B) and
MIRACIL-D, i.e. 1-diethylaminoethylamino-4-methylthiaxanthone (C)

|  | Minimal inhibiting concentration mg./liter | | |
|---|---|---|---|
|  | (E) | (T) | (S) |
| 8-(β,β,β-trichloroethylidene)-aminoquinoline | 15,5 | 7,5–15,5 | 1,7 |
| 2-(β,β,β-trichloroethylidene)-amino-5-nitro-thiazol | 0,8 | 1,7–3,5 | 0,8 |
| 2-(β,β,β-trichloroethylidene)-amino-thiazol | 3,5 | 15, 5–31 |  |
| 2-(β,β,β-trichloroethylidene)-amino-4-methylthiazol | 15,5 | 1,7–3,5 | 3,5 |
| 4-(β,β,β-trichloroethylidene)-amino-7-chloroquinoline | 1,7 | 0,8 | 2,5 |
| 1-(β,β,β-trichloroethylidene)-amino-5,6,7,8-tetrahydronaphthalene | 3,5–1,7 | 31–15,5 | 2,5 |
| (A) | 15,5 | 15,5 | 31 |
| (B) | 15,5–31 | 7,5–15,5 | 15,5 |
| (C) | 3,5–7,5 | 3,5–7,5 | 7,5 |

The preparation of the new compounds is shown in more details by the following examples.

EXAMPLE 1

A mixture of 13.5 g. (0.096 mol.) of 8-amino quinoline and 13.22 g. (0.09 mol.) of trichloroacetaldehyde in 150 ml. of benzene is refluxed for 3 hours and the solvent is then distilled off in vacuo. The 8-(β,β,β-trichloroethylidene)-amino-quinoline is a crystalline product melting at 58°–62° C.

EXAMPLE 2

A mixture of 15.5 g. (0.1 mol.) of 2-amino-5-nitrothiazol and 14.8 g. (0.1 mol.) of trichloroacetaldehyde in 100 ml. of benzene is refluxed for 3 hours, the reaction mixture is then cooled and the precipitated 2-(β,β,β-trichloroethylidene)-amino-5-nitrothiazol is collected; m.p. 187°–188° C.

EXAMPLE 3 twenty grams (0.2 mol.) of 2-aminothiazol are reacted with 29.48 g. (0.2 mol.) of trichloroacetaldehyde in 500 ml. of abs. benzene at 80° C.; the water formed is distilled off and separated during the reaction. After 3 hours the reaction product is collected by filtration. 42.3 g. of 2-(β,β,β-trichloroethylidene)-amino-thiazol (92 percent of the theoretical yield) are obtained; m.p. 146°–147° C.

EXAMPLE 4

22.6 g. (0.19 mol.) of 2-amino-4-methyl-thiazol and 27.9 g. (0.19 mol.) of trichloroacetaldehyde in 250 ml. of benzene are refluxed for 3 hours. During this time the initially 2-phase mixture becomes homogeneous and a precipitate appears at the end of the reaction. After cooling, the precipitate is collected by filtration; 43.5 g. of 2-(β,β,β-trichloroethylidene)-amino-4-methyl-thiazol (89,3 percent of the theoretical yield) are obtained, m.p. 165°–166° C. (decomp.).

EXAMPLE 5

17.86 g. (0.1 mol.) of 4-amino-7-chloro-quinoline are dissolved in 500 ml. of toluene and 14.74 g. (0.1 mol.) trichloroacetaldehyde are added thereto. After ceasing of the exotherm reaction the mixture is refluxed for 6 hours and then the product is collected by filtration. 23.6 g. of 4-(β,β,β-trichloroethylidene)-amino-7-chloro-quinoline (76.6 percent of the theoretical yield) are obtained; m.p. 168°–169° C.

EXAMPLE 6

22.05 g. (0.15 mol.) of 1-amino-5,6,7,8-tetrahydronaphthalene and 22.11 g. (0.15 mol.) of trichloroacetaldehyde in 250 ml. of xylene are reacted at 140° C. for 3 hours. The reaction mixture is then evaporated in vacuo and the residue is distilled under 3 mm. mercury at 161°–162° C. 21.6 g. of 1-(β,β,β-trichloroethylidine-amino5,6,7,8-tetrahydronaphthalene (52.2 percent of the theoretical yield) are obtained.

We claim:
1. A compound of the formula
$$A-N=CH-CCl_3$$
wherein A represents a quinolyl-4 or quinolyl-8 group unsubstituted or substituted by halogen, lower alkyl or nitro, and the pharmaceutically acceptable acid addition salts thereof.
2. 8-(β,β,β-trichloroethylidene)-aminoquinoline.
3. 4-(β,β,β-trichloroethylidene)-amino-7-chloroquinoline.

* * * * *